United States Patent [19]
Kaji

[11] Patent Number: 5,982,215
[45] Date of Patent: Nov. 9, 1999

[54] ANALOG SIGNAL TRANSMISSION CIRCUIT

[75] Inventor: Koichi Kaji, Hidaka, Japan

[73] Assignee: Kabushiki Kaisha Toshiba, Kawasaki, Japan

[21] Appl. No.: 09/044,937

[22] Filed: Mar. 20, 1998

[30] Foreign Application Priority Data

Mar. 27, 1997 [JP] Japan ..................................... 9-075187

[51] Int. Cl.$^6$ ...................................................... H03L 5/00
[52] U.S. Cl. ......................................... 327/307; 327/362
[58] Field of Search .................................... 327/307, 362, 327/304, 333, 594, 595, 110, 91, 354; 333/26

[56] References Cited

U.S. PATENT DOCUMENTS 5,043,598  8/1991  Maeda et al. ............................. 327/538
5,570,276  10/1996  Cuk et al. ................................. 363/16
5,708,377  1/1998  Bradley ..................................... 327/91

FOREIGN PATENT DOCUMENTS 4-64839  6/1992  Japan ............................. H04L 25/02

*Primary Examiner*—Toan Tran
*Attorney, Agent, or Firm*—Finnegan, Henderson, Farabow, Garrett & Dunner, L.L.P.

[57] ABSTRACT

An analog signal transmission circuit includes a transformer, an amplifier for driving the transformer, first and second polar capacitors connected in series between the amplifier and the transformer such that those terminals of the first and second polar capacitors which have the same polarity are connected to each other, and an element, connected to the terminals of the first and second polar capacitors, for applying a DC bias in accordance with the polarity of the terminals of the first and second polar capacitors.

47 Claims, 10 Drawing Sheets

ANALOG SIGNAL TRANSMISSION CIRCUIT

BACKGROUND OF THE INVENTION

This application is based on Japanese Patent Application No. 9-75187, filed Mar. 27, 1997, the content of which is incorporated herein by reference.

The present invention relates to an analog signal transmission circuit, and in particular to an analog signal transmission circuit in which a DC offset current is cut by polar capacitors.

In general, an analog signal transmission circuit provided in a modem or the like incorporates a drive circuit which has a transformer for transforming power and insulating the analog signal transmission circuit from an external circuit. The transformer is driven by a single-end type amplifier or a push-pull type amplifier (hereinafter referred to as a differential amplifier).

FIG. 1 shows a conventional analog signal transmission circuit in which the transformer is driven by a differential amplifier 1. As seen from FIG. 1, the amplifier 1 is a differential input/output type amplifier and has a positive output terminal 2 and a negative output terminal 3. Signals are supplied from the output terminals 2 and 3 to the transformer 6 through output resistors 4 and 5, respectively. The values of the output resistors 4 and 5 are determined so as to satisfy the impedance matching with the characteristic impedance of a communication circuit connected to secondary windings of the transformer 6. The output terminals 2 and 3 of the amplifier 1 are connected to the transformer 6 in a DC manner. In general, a DC voltage is superimposed on the output of the amplifier 1. The voltage between the output terminals 2 and 3 includes an error voltage referred to as "offset voltage". In the circuit shown in FIG. 1, a DC offset current I flows due to the offset voltage as shown in FIG. 2. The offset current I flows through windings of the transformer 6. The offset voltage at the positive output terminal 2 is higher than that of the negative output terminal 3. Thus, the current flowing through the windings of the transformer 6 has the waveform shown in FIG. 3. The offset current I flows from the positive output terminal 2 to the negative output terminal 3 as indicated by arrows in FIG. 2.

If the offset voltage at the negative output terminal 3 is higher than that at the positive output terminal 2, the offset current I flows from the negative output terminal 3 to the positive output terminal 2.

FIG. 4 shows a conventional analog signal transmission circuit in which no offset current I flows through the windings of the transformer 6. The circuit has a capacitor 7 for cutting a direct current. Thus, the capacitor 7 prevents the offset current I from flowing through the windings of the transformer 6. The capacitor 7 is a non-polar one as in most analog signal transmission circuits. This is because which potential is higher, the potential at the positive output terminal 2 or the potential at the negative output terminal 3, depends on each analog signal transmission circuit.

Generally, a circuit for processing low-frequency signals has a capacitor which has a large capacitance. A few kinds of non-polar capacitors, each having a large capacitance, are available. In particular, only a few kinds of non-polar capacitors, each having a capacitance of tens of microfarads ($\mu$F) are available. Hence, as is well known, polar capacitors are modified to be non-polar and used in most cases.

FIG. 5 shows a conventional analog signal transmission circuit having two polar capacitors 8, not a non-polar capacitor. The two polar capacitors 8 are connected in serial and are non-polarized. They are connected at their negative-side terminals. They may be connected at their positive-side terminals.

FIG. 6 shows a conventional analog signal transmission circuit which differs from the circuit shown in FIG. 5 in that the transformer 6 is connected between the capacitors 8. However, the circuit has the same advantage as the circuit shown in FIG. 5.

The circuits shown in FIGS. 5 and 6, having non-polarized capacitors, however, have the following disadvantages:

One of the capacitors cannot perform its inherent function since a reverse DC voltage is applied to it. Thus, it cannot cut a DC offset current reliably. To be more specific, its capacitance decreases when a reverse voltage is applied to the capacitor. Thus, it is small, as compared with the case where a forward voltage is applied to the capacitor.

BRIEF SUMMARY OF THE INVENTION

The object of the present invention is to provide an analog signal transmission circuit which uses polar capacitors, and is designed such that a forward DC voltage is applied to the polar capacitors, ensuring the functions thereof.

The analog signal transmission circuit of the present invention comprises a transformer, an amplifier for driving the transformer, and first and second polar capacitors which are connected in series such that those terminals of the first and second polar capacitors which have the same polarity are connected to each other, wherein the analog signal transmission circuit includes an element, which is connected between the terminals of the first and second polar capacitors which have the same polarity, for applying thereto a DC bias in accordance with the polarity of the terminals of the first and second polar capacitors.

In the circuit, a predetermined DC bias is applied to the terminals of the first and second polar capacitors, and the potentials of the DC components at the terminals of the first and second capacitors are fixed at a DC bias potential. Therefore, the relationships between the DC offset potential of the output of the amplifier 1 and the potentials at the terminals of the first and second are the same as each other. A forward DC voltage can be applied to each of the first and second polar capacitors. Therefore, the polar capacitors can perform their inherent functions. The analog signal transmission circuit has a high performance.

A resistor or an inductance element can be used as the element for applying a DC bias.

As explained above, according to the present invention, the analog signal transmission circuit is designed such that a forward DC voltage is applied to the polar capacitors. Thus, the polar capacitors can perform their inherent functions. A device having the circuit of the present invention can operate reliably.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be explained with reference to the accompanying drawings.

Figure 1:
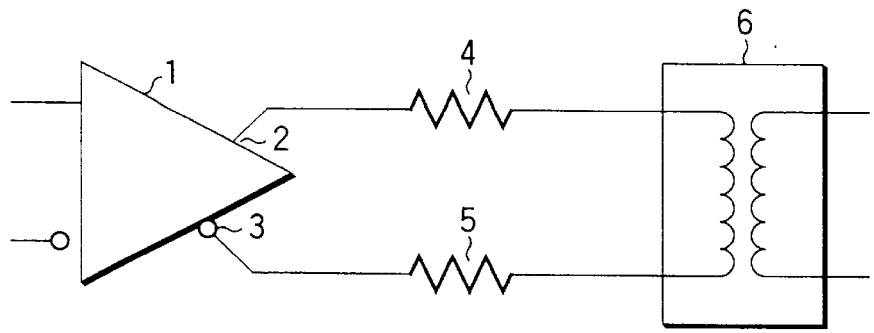
FIG. 1 is a view showing the structure of a conventional analog signal transmission circuit.
Figure 2:
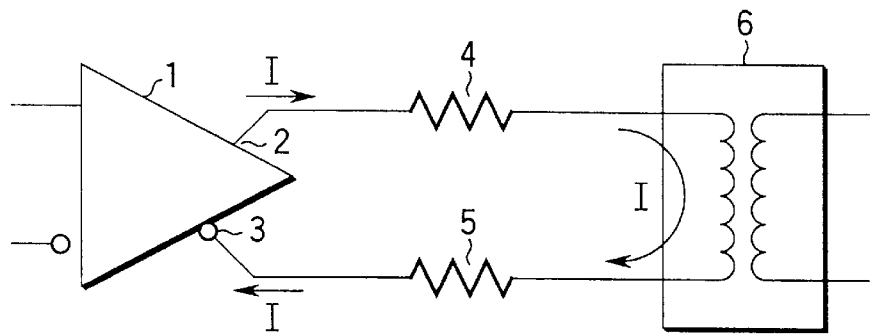
FIG. 2 is a view for explaining a DC offset current in the conventional analog signal transmission circuit.
Figure 3:
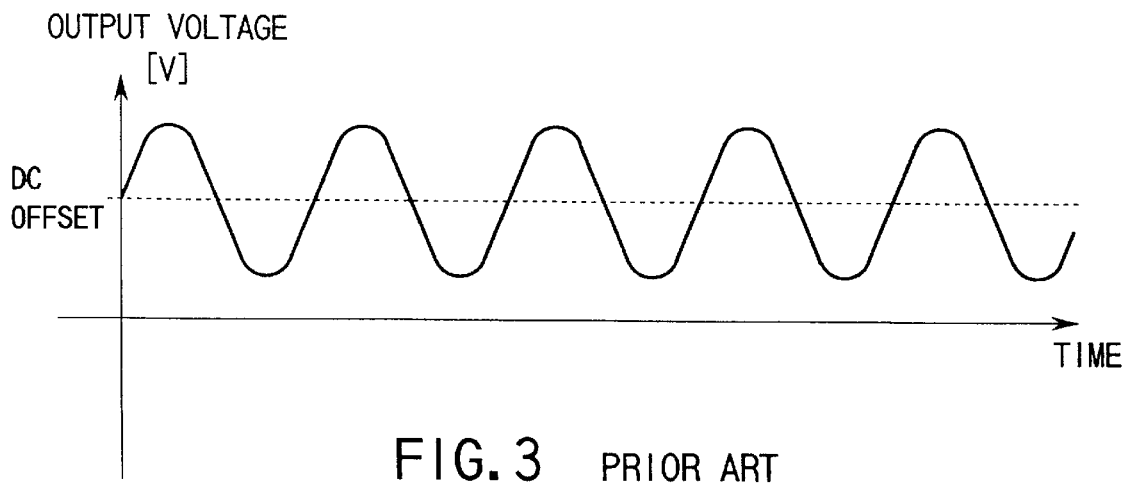
FIG. 3 is a view showing an output waveform of the conventional analog signal transmission circuit.
Figure 4:
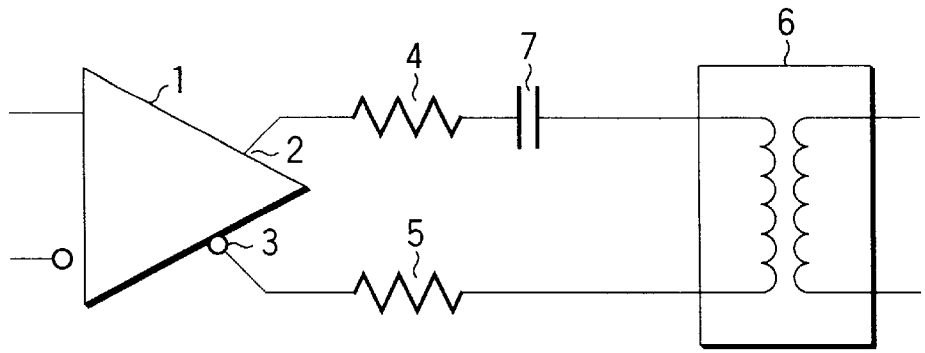
FIG. 4 is a view showing the structure of another conventional analog signal transmission circuit.
Figure 5:
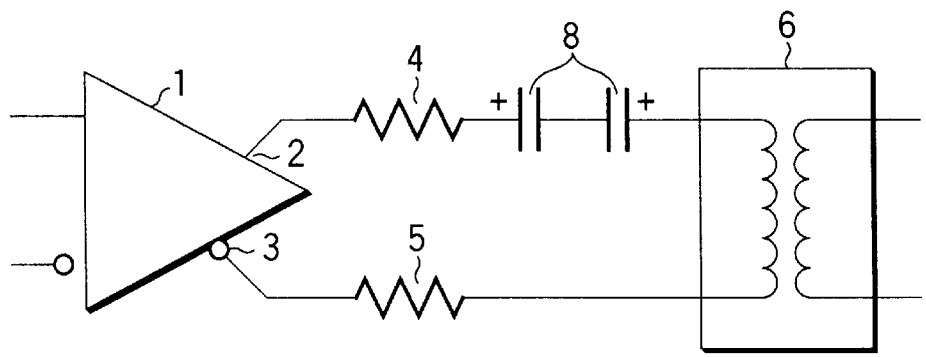
FIG. 5 is a view showing the structure of a further conventional analog signal transmission circuit.
Figure 6:
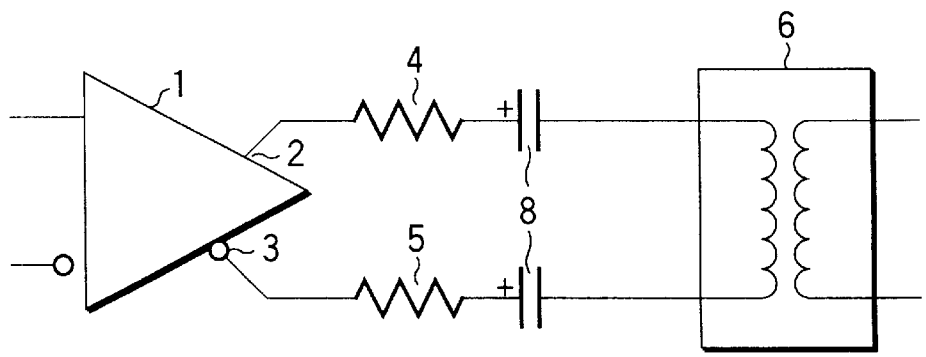
FIG. 6 is a view showing the structure of yet another conventional analog signal transmission circuit.
Figure 7:
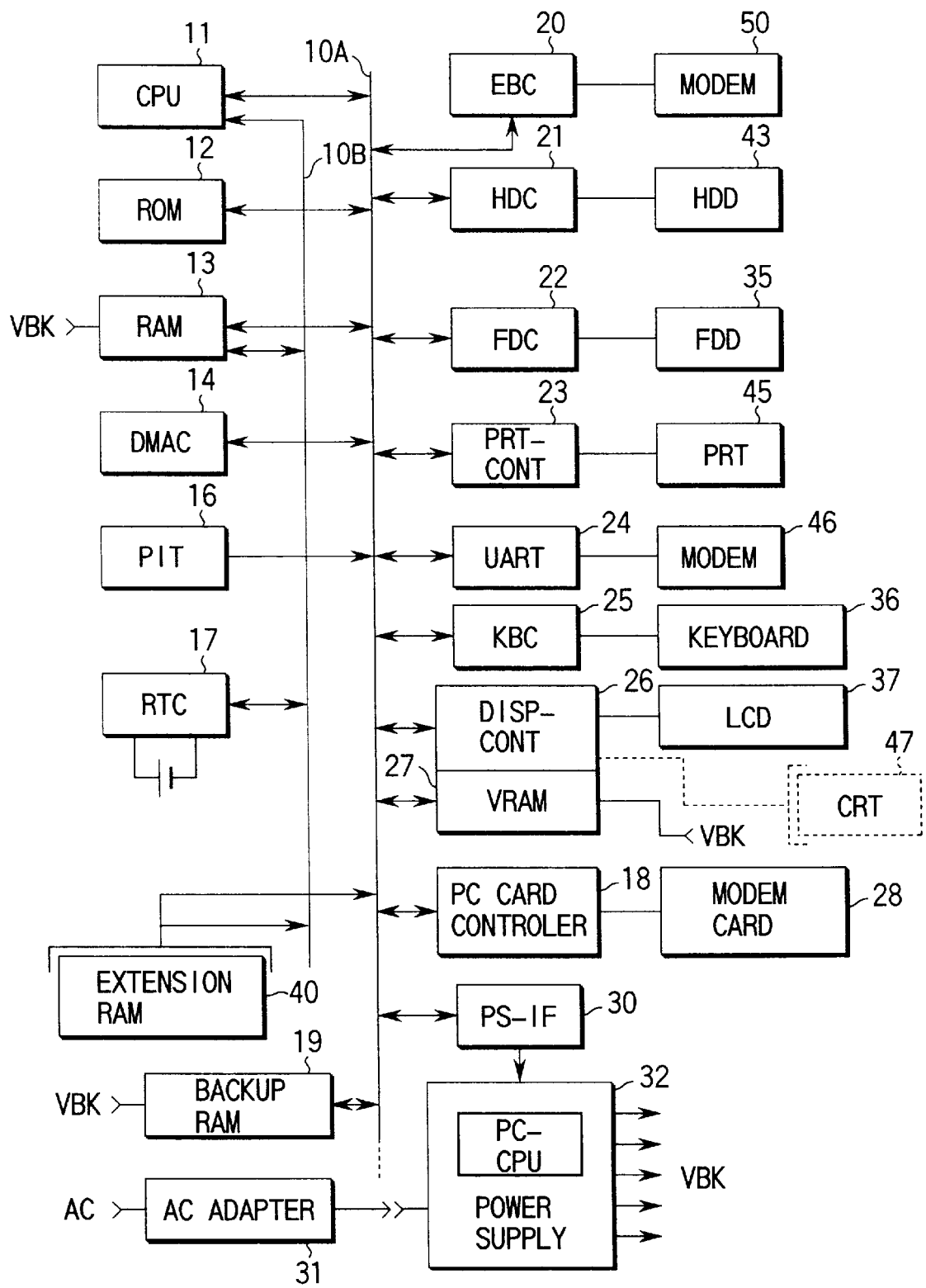
FIG. 7 is a system block diagram of a computer system in which an analog signal transmission circuit according to the embodiment of the present invention is applied to a modem.

FIG. 7 is a block diagram of a computer system in which an analog signal transmission circuit according to the embodiment of the present invention is applied to a modem circuit.

The computer system shown in FIG. 7 has a system bus 10A and an inner bus 10B. The following structural elements are connected to the system bus 10A: a CPU 11 for controlling the computer system; a ROM (read-only memory) 12 in which a fixed program or the like is stored; a RAM (random-access memory) 13 constituting a main memory in which a program, a data or the like, to be processed, is stored; a DMAC (direct memory access controller) 14 for controlling direct memory access; a PIT (programmable interval timer) 16 which can be set according to a program; an RTC (real-time clock) 17 which is a clock module having a battery for use in operation; a backup RAM 19 serving as a data storing region having a resume function; an EBC (extension bus connector) 20 for use in extension of the function; a HDC (hard disc controller) 21 for interfacing a hard disc drive 43; an FDC (floppy disk controller) 22 for controlling a floppy disk drive 35; a print controller 23 for controlling a printer 45; a UART (Universak Asynchronous Receiver/Transmitter) 24 which is an input/output interface to which an RS-232C interface device 46 such as a modem circuit or the like is connected as occasion demands; a KBC (keyboard controller) 25 for controlling an input operation of a keyboard 36; a DISP-CONT (display controller) 26 for controlling an LCD 37; a VRAM (video RAM) 27 to which a backup power supply voltage is applied; a PC card controller for controlling kinds of cards such as a modem card 28; and a PS-IF (power supply-control interface) 30 connecting a power supply circuit 32 to the CPU 11 through the system bus 10A. In the embodiment, for example, a modem circuit 50 serving as a communication board is connected to an EBC (extension bus connector) 20.

Figure 8:
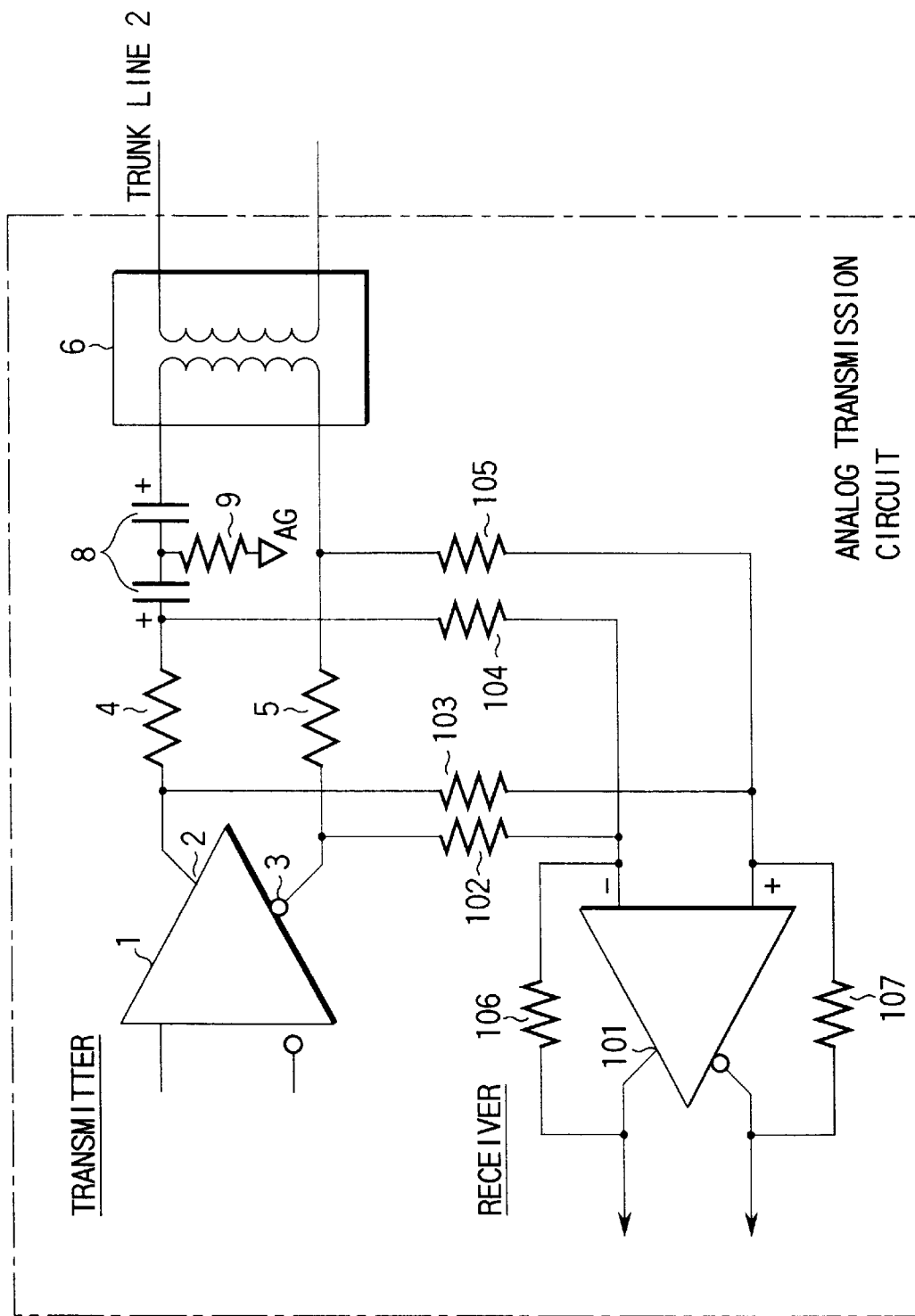
FIG. 8 is a circuit diagram showing the structure of the analog signal transmission circuit according to the embodiment of the present invention.

FIG. 8 shows the structure of the analog signal transmission circuit according to the embodiment of the present invention which is applied to, e.g., the modem circuit 50 or the modem card 28 shown in FIG. 7. The analog signal transmission circuit is used as a hybrid circuit for enabling a four-wire transmission line to be used, in addition to a two-wire transmission line, in a modem or the like, and comprises a transmitter for transmitting an analog signal through an external two-wire communication line, and a receiver for receiving an analog signal externally sent through the external communication line.

The transmitter comprises a differential amplifier 1, output resistors 4 and 5, two polar capacitors 8, and a resistor 9 for use in application of a DC bias. The receiver comprises a differential amplifier 101 for receiving and amplifying a signal externally transmitted through input resistors 104 and 105, resistors 102 and 103 for use in prevention of counterflow of a differential output from the differential amplifier 1, and resistors 106 and 107 for use in connection of a negative-feedback loop.

As shown in FIG. 8, one end of the resistor 9 is connected to a node at which those terminals of the two polar capacitors 8 which have the same polarity are connected to each other, and the other end of the resistor 9 is connected to a ground terminal AG. The analog signal transmission circuit shown in FIG. 8 is directed to the case where the DC offset voltages at output terminals 2 and 3 of the amplifier 1 are positive with respect to the potential of the ground terminal AG (hereinafter referred to as "ground potential"). To be more specific, the negative-side terminals of the capacitors 8 are grounded through the resistor 9, and the potentials at the terminals 2 and 3 are positive. Thus, the capacitors 8 are forward-biased. When an AC analog signal is output from the differential amplifier 1, the positive side of each of the capacitors 8 performs an oscillation function on the basis of a DC potential of the output of the amplifier 1, and the negative side of each capacitor 8 performs an oscillation function on the basis of the ground potential.

Figure 9:
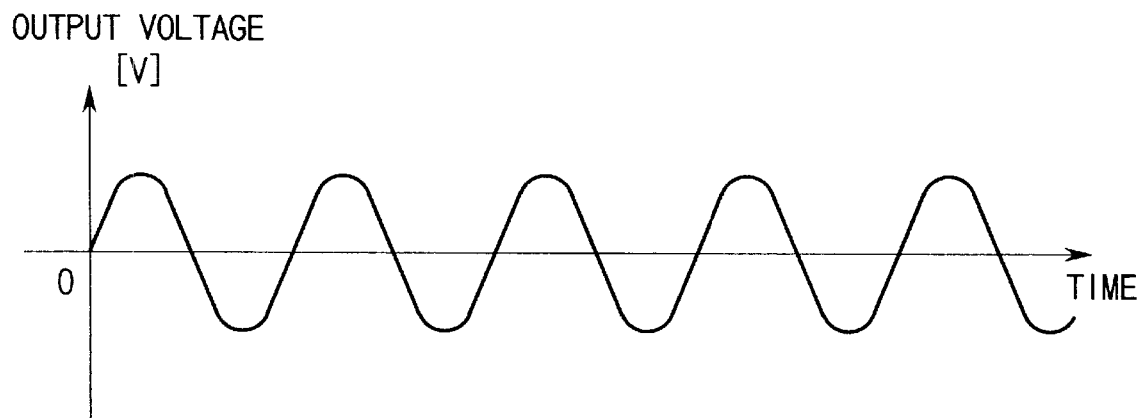
FIG. 9 is a view showing an output waveform of the analog signal transmission circuit according to the embodiment of the present invention.

The capacitors 8 cut the DC components of the positive voltages at the output terminals 2 and 3. Thus, a direct current is prevented from flowing through the windings of the transformer 6, and the output waveform of the windings is obtained as shown in FIG. 9.

In the analog signal transmission circuit shown in FIG. 8, the polar capacitors 8 are connected such that those terminals of the capacitors 8 which have the same polarity face each other, and are forward-biased, ensuring the inherent functions of the capacitors 8. Therefore, a device having the analog signal transmission circuit can operate reliably. In addition, the following advantage can be obtained:

The capacitors 8 and the resistor 9 are located in a small region. In other words, a DC bias circuit comprising the capacitors 8 and the resistor 9 is small. As a result, the analog signal transmission circuit is also small.

Figure 10:
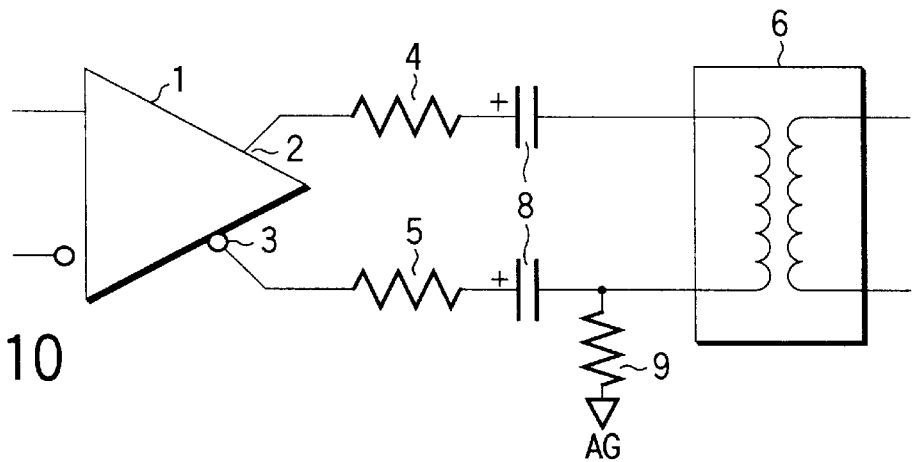
FIG. 10 is a circuit diagram showing a second example of the analog signal transmission circuit according to the embodiment of the present invention.

FIG. 10 shown the second example of the transmitter provided in the analog signal transmission circuit according to the embodiment of the present invention.

In the second example, the two polar capacitors 8 are connected in series through the windings of the transformer 6 such that those terminals of the capacitors 8 which have the same polarity are connected to each other. One end of the resistor 9 is connected to a node at which one of the windings of the transformer 6 is connected to the negative side of one of the capacitors 8 which is connected to the negative output terminal 3 of the differential amplifier 1. The other end of the resistor 9 is connected to the ground terminal AG.

The second example is also directed to the case where the DC voltages at the output terminals 2 and 3 of the amplifier 1 are positive with respect to the ground potential. The potential of the DC component at the negative side of each capacitor 8 is held at the ground potential by the resistor 9. The output terminals 2 and 3 are positive, and thus the capacitors 8 are forward-biased.

When a DC analog signal is output from the differential amplifier 1, the positive side of each capacitor 8 performs an oscillation function on the basis of a DC potential of the output of the amplifier 1, and the negative side of each capacitor 8 performs an oscillation function on the basis of the ground potential.

A direct current is prevented from flowing through the windings of the transformer 6 since the DC components of the positive voltages at the output terminals 2 and 3 are cut.

By virtue of the above structure, the transmitter shown in FIG. 10, as well as the transmitter shown in FIG. 8, ensures the inherent functions of the capacitors 8 since the capacitors 8 are forward-biased. Thus, a device having the transmitter of FIG. 10 can operate reliably.

Figure 11:
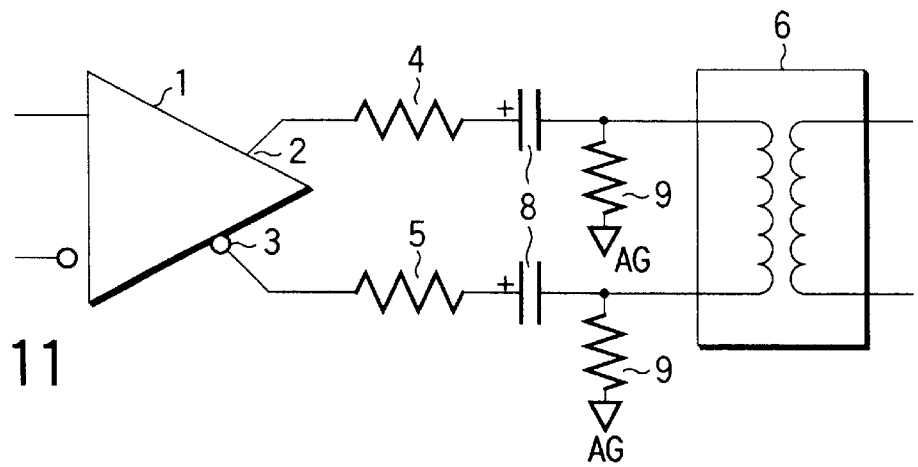
FIG. 11 is a circuit diagram showing a third example of the analog signal transmission circuit according to the embodiment of the present invention.

FIG. 11 shows the third example of the transmitter provided in the analog signal transmission circuit according to the embodiment of the present invention.

In the third example, the ends of two resistors 9 having the same value are respectively connected to the negative-side terminals of the two polar capacitors 8. The other ends of the resistors 9 are connected to the ground terminal AG. The third example is also directed to the case where the DC voltages at the output terminals 2 and 3 are positive with respect to the ground potential. The number of resistors is larger than that of resistors provided in each of the transmitters shown in FIGS. 8 and 10, in order to more balance the AC component.

More specifically, in the circuits of FIGS. 8 and 10, a noise is applied to only one end side of the windings of the transformer 6 through the resistor 9, when the ground potential varies. The noise is transmitted to a communication line as a normal mode noise which varies only the potential of one of the two wire paths of a two-wire transmission line, since the transformer 6 is not balanced with respect to the ground terminal AG. The normal mode noise is an undesirable noise for communication.

On the other hand, in the circuit of FIG. 11, when the ground potentials vary, the varied potentials, which are identical, are applied to both end sides of the windings of the transformer 6 through the resistors 9. In other words, they are transmitted to the transformer 6 as common mode noises. Common mode noise components are eliminated by the transformer 6. Therefore, no noise is transmitted to the communication line comprising two transmission lines.

Figure 12:
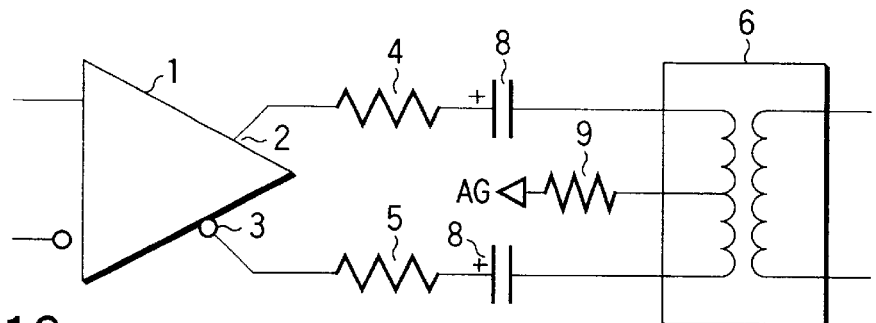
FIG. 12 is a circuit diagram showing a fourth example of the analog signal transmission circuit according to the embodiment of the present invention.

FIG. 12 shows the fourth example of the transmitter provided in the analog signal transmission circuit according to the embodiment of the present invention.

In the fourth example, the transformer 6 and the resistor 9 are connected between the negative sides of the two polar capacitors 8. One end of the resistor 9 is connected to a tap of the transformer 6, and the other end of the resistor 9 is connected to the ground terminal AG. The fourth example is also directed to the case where the DC voltages at the output terminals 2 and 3 are positive with respect to the ground potential. The tap of the transformer 6 is located at a middle point of the windings, balancing the AC component as in the transmitter shown in FIG. 11. In the transmitter shown in FIG. 12, a common mode noise is applied to the transformer 6 through the resistor 9, and a common mode noise component is eliminated due to the common mode component-eliminating function of the transformer 6. As a result, no noise is transmitted to the communication line.

Figure 13:
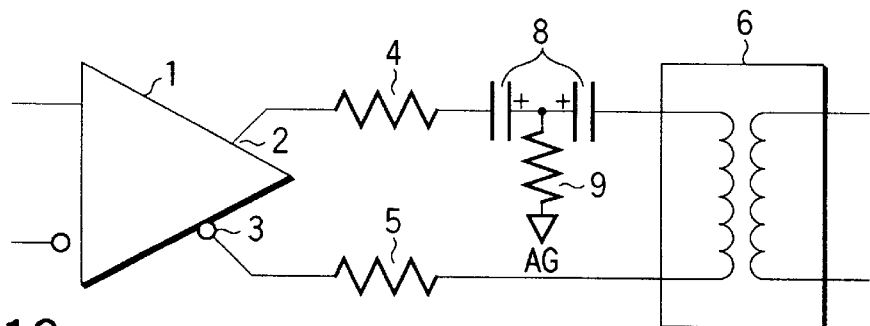
FIG. 13 is a circuit diagram showing a fifth example of the analog signal transmission circuit according to the embodiment of the present invention.

FIG. 13 shows the fifth example of the transmitter provided in the analog signal transmission circuit according to the embodiment of the present invention.

In the fifth example, the positive-side terminals of the two polar capacitors 8 are connected to each other. One end of the resistor 9 is connected to a node at which the capacitors 8 are connected to each other, and the other end of the resistor 9 is connected to the ground terminal AG. The transmitter of the fifth example corresponds to the transmitter shown in FIG. 8. However, unlike the transmitter of FIG. 8, the transmitter of the fifth example is directed to the case where the DC voltages at the output terminals 2 and 3 are negative with respect to the ground potential. Thus, the potentials of the DC components at the positive sides of the two polar capacitors 8 are held at the ground potential by the resistor 9. The capacitors 8 are forward-biased since the potentials of the output terminals 2 and 3 are negative.

When a DC analog signal is output from the differential amplifier 1, the negative side of each capacitor 8 performs an oscillation function on the basis of the DC potential of the output of the amplifier 1, and the positive side of each capacitor 8 performs an oscillation function on the basis of the ground potential.

A direct current is prevented from flowing through the windings of the transformer 6 since the DC components of the negative voltages at the output terminals 2 and 3 are cut.

Figure 14:
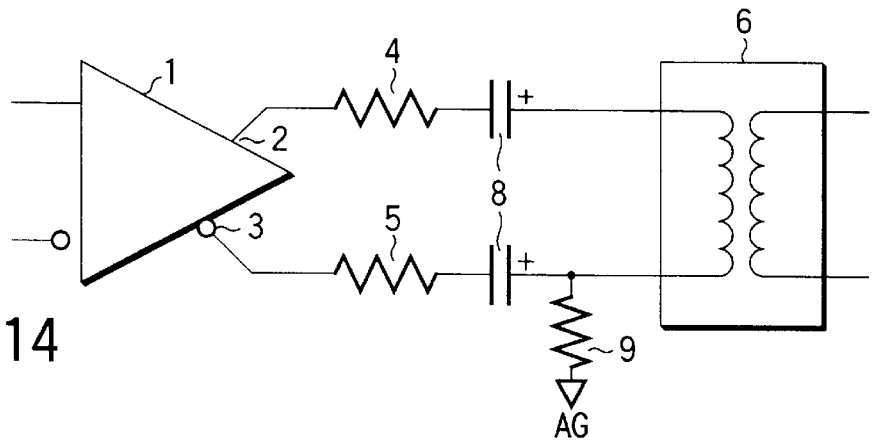
FIG. 14 is a circuit diagram showing a sixth example of the analog signal transmission circuit according to the embodiment of the present invention.

FIG. 14 shows the sixth example of the transmitter provided in the analog signal transmission circuit according to the embodiment of the present invention.

In the sixth example, the positive-side terminals of the two polar capacitors 8 are connected through the transformer 6. One end of the resistor 9 is connected to the positive-side terminal of one of the capacitors 8 which is connected to the negative output terminal 3. The other end of the resistor 9 is connected to the ground terminal AG. This example is also directed to the case where the DC voltages at the output terminals 2 and 3 are negative with respect to the ground potential. The potentials of the DC components at the positive sides of the capacitors 8 are held at the ground potential by the resistor 9. The capacitors 8 are forward-biased since the potentials of the output terminals 2 and 3 are negative.

When a DC analog signal is output from the differential amplifier 1, the negative side of each capacitor 8 performs an oscillation function on the basis of the DC potential of the output of the amplifier 1, and the positive side of each capacitor 8 performs an oscillation function on the basis of the ground potential.

A direct current is prevented from flowing through the windings of the transformer 6 since the DC components of the negative voltages at the output terminals 2 and 3 are cut.

In the transmitter of the sixth example, the capacitors 8 are forward-biased as in the transmitter of FIG. 13 (the fifth example), ensuring the inherent functions of the capacitors 8. Thus, a device having the transmitter of the sixth example can operate reliably.

Figure 15:
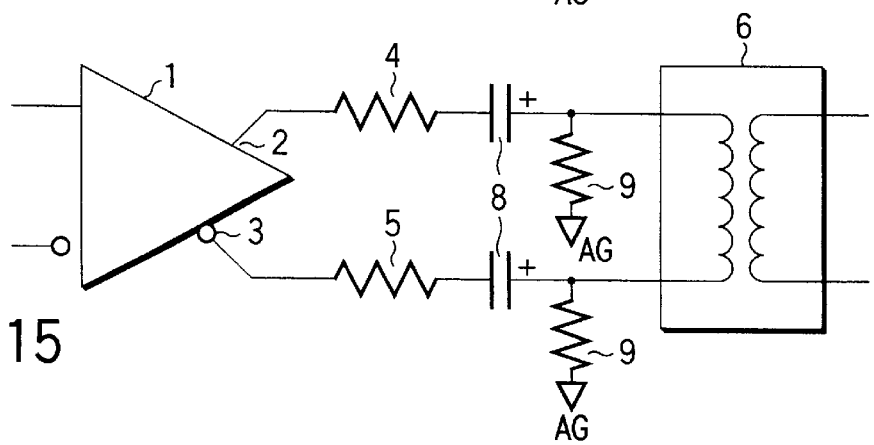
FIG. 15 is a circuit diagram showing a seventh example of the analog signal transmission circuit according to the embodiment of the present invention.

FIG. 15 shows the seventh example of the transmitter provided in the analog signal transmission circuit according to the embodiment of the present invention.

In the seventh example, the ends of the resistors 9 having the same value are respectively connected to the positive-side terminals of the two polar capacitors 8. The other ends of the resistors 9 are connected to the ground terminals AG. This example is also directed to the case where the DC voltages at the output terminals 2 and 3 are negative with respect to the ground potentials. The number of resistors is larger than that of resistors provided in the transmitter shown in each of FIGS. 13 and 14, in order to more balance the AC component.

Figure 16:
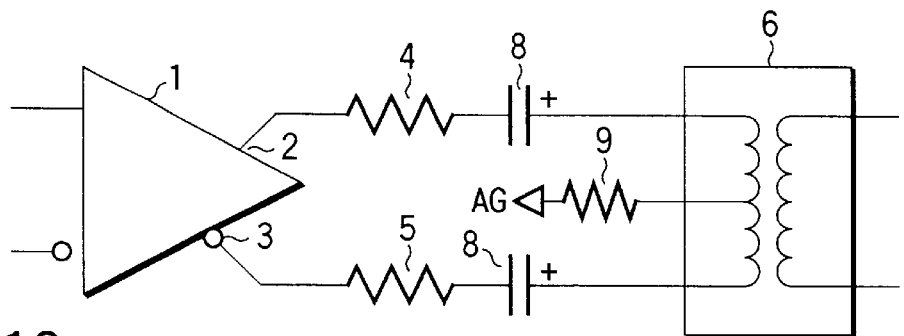
FIG. 16 is a circuit diagram showing an eighth example of the analog signal transmission circuit according to the embodiment of the present invention.

FIG. 16 shows the eighth example of the transmitter provided in the analog signal transmission circuit according to the embodiment of the present invention.

In the eighth example, the transformer 6 and the resistor 9 are connected between the positive-side terminals of the two polar capacitors 8. One end of the resistor 9 is connected to the tap of the transformer 6, and the other end of the resistor 9 is connected to the ground terminal AG. This example is also directed to the case where the DC voltages at the output terminals 2 and 3 are negative with respect to the ground potential. The tap is located at a middle point of the windings, balancing the AC component as in the transmitter shown in FIG. 15. In the transmitter shown in FIG. 16, a common mode noise is applied to the transformer 6 through the resistor 9, and a common mode component is eliminated due to the common mode component-eliminating function of the transformer 6. As a result, no noise is transmitted to the communication line.

Figure 17:
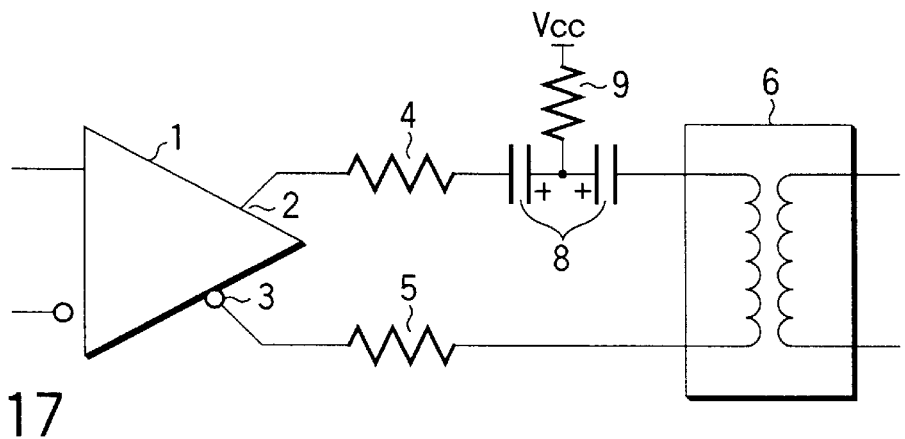
FIG. 17 is a circuit diagram showing a ninth example of the analog signal transmission circuit according to the embodiment of the present invention.

FIG. 17 shows the ninth example of the transmitter provided in the analog signal transmission circuit according to the embodiment of the present invention.

In the ninth example, one end of the resistor 9 is connected to the connecting point of the two polar capacitors 8, and the other end of the resistor 9 is connected to a positive power supply Vcc. This example is directed to the case where the DC voltages at the output terminals 2 and 3 are negative with respect to the potential of the power supply Vcc. The potentials of the DC components at the positive sides of the capacitors 8 are held at the ground potential. The capacitors 8 are forward-biased since the potentials of the output terminals 2 and 3 are negative.

Figure 18:
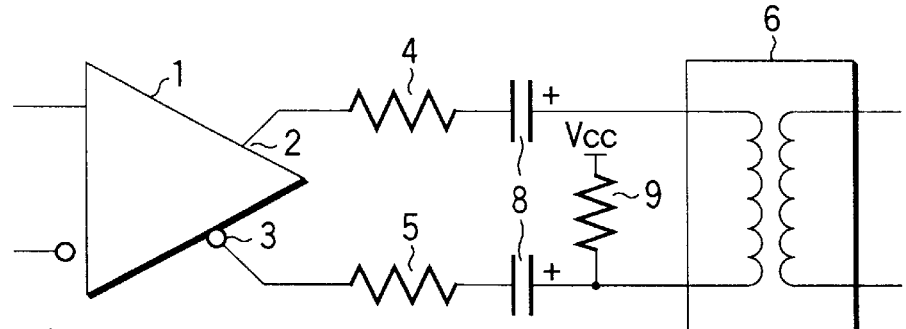
FIG. 18 is a circuit diagram showing a tenth example of the analog signal transmission circuit according to the embodiment of the present invention.

FIG. 18 shows the tenth example of the transmitter provided in the analog signal transmission circuit according to the embodiment of the present invention.

In the tenth example, the positive-side terminals of the two polar capacitors 8 are connected through the transformer 6. One end of the resistor 9 is connected to the positive-side terminal of one of the capacitors 8 which is connected to the output terminal 3 of the amplifier 1, and the other end of the resistor 9 is connected to the positive power supply Vcc. This example is also directed to the case where the DC voltages at the output terminals 2 and 3 are negative with respect to the potential of the power supply Vcc. The potentials of the DC components at the positive sides of the capacitors 8 are held at the potential of the positive power supply Vcc. The capacitors 8 are forward-biased since the potentials at the output terminals 2 and 3 are negative.

Figure 19:
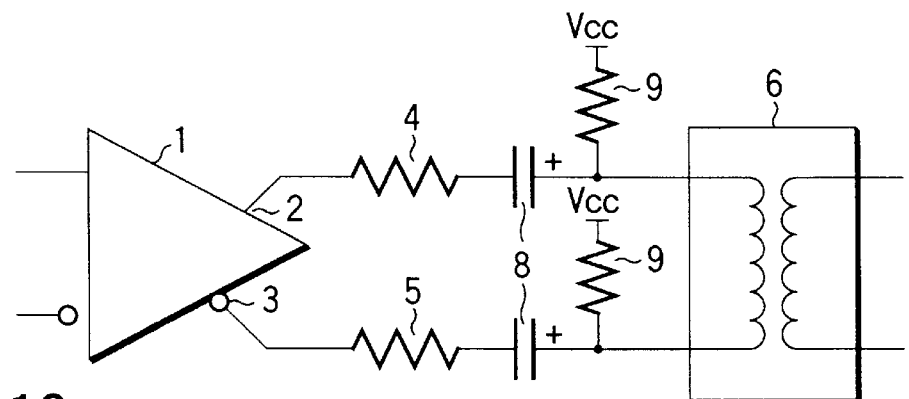
FIG. 19 is a circuit diagram showing an eleventh example of the analog signal transmission circuit according to the embodiment of the present invention.

FIG. 19 shows the eleventh example of the transmitter provided in the analog signal transmission circuit according to the embodiment of the present invention.

In the eleventh example, the positive-side terminals of the two polar capacitors 8 are connected through the transformer 6. The ends of the resistors 9 are respectively connected to the capacitors 8, and the other ends of the resistors 9 are connected to the positive power supplies Vcc. This example is also directed to the case where the DC voltages at the output terminals 2 and 3 are negative with respect to the potential of the power supplies VCC. The number of resistors is larger than that of resistors provided in the transmitter shown in each of FIGS. 17 and 18, in order to more balance the AC component. When the positive power supply potential varies, the varied potential is transmitted to the transformer 6 as a common mode noise, and a common mode noise component is eliminated by the transformer 6.

Figure 20:
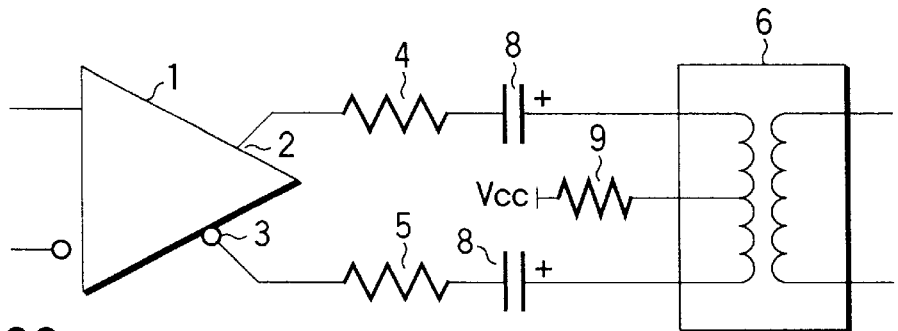
FIG. 20 is a circuit diagram showing a twelfth example of the analog signal transmission circuit according to the embodiment of the present invention.

FIG. 20 shows the twelfth example of the transmitter provided in the analog signal transmission circuit according to the embodiment of the present invention.

In the twelfth example, the transformer 6 and the resistor 9 are connected between the positive-side terminals of the two polar capacitors 8. One end of the resistor 9 is connected to the tap of the transformer 6, and the other end of the resistor 9 is connected to the positive power supply Vcc. This example is also directed to the case where the DC voltages at the output terminals 2 and 3 are negative with respect to the potential of the power supply Vcc. The tap is located at a middle point of the windings, balancing the AC component as in the transmitter shown in FIG. 19. In the transmitter shown in FIG. 20, a common mode noise is applied to the transformer 6 through the resistor 9, and a common mode noise component is eliminated by the transformer 6. As a result, no noise is transmitted to the communication line.

Figure 21:
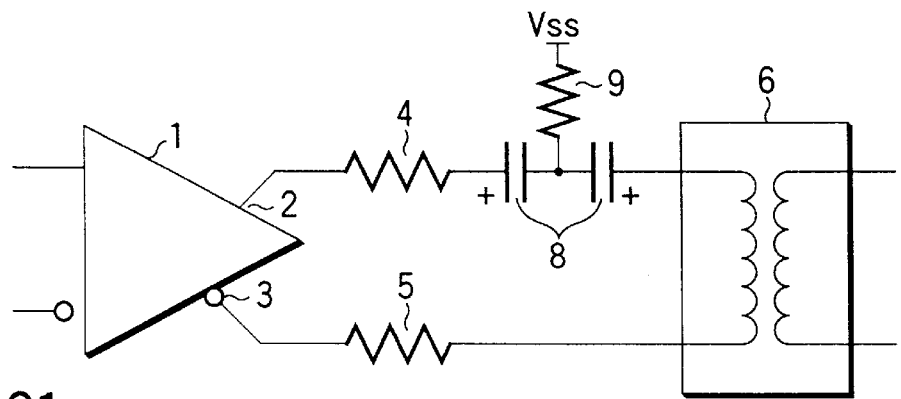
FIG. 21 is a circuit diagram showing a thirteenth example of the analog signal transmission circuit according to the embodiment of the present invention.

FIG. 21 shows the thirteenth example of the transmitter provided in the analog signal transmission circuit according to the embodiment of the present invention.

In the thirteenth example, one end of the resistor 9 is connected to a node at which the two polar capacitors 8 are connected to each other, and the other end of the resistor 9 is connected to a negative power supply Vss. This example is also directed to the case where the DC voltages at the output terminals 2 and 3 are negative with respect to the potential of the negative power supply Vss. The potentials of the DC components at the negative sides of the capacitors 8 are held at the potential of the negative power supply Vss. The capacitors 8 are forward-biased since the potentials at the output terminals 2 and 3 are positive.

When a DC analog signal is output from the differential amplifier 1, the positive side of each capacitor 8 performs an oscillation function on the basis of the DC potential of the output of the amplifier 1, and the negative side of each capacitor 8 performs an oscillation function on the basis of the negative power supply potential.

A direct current is prevented from flowing through the windings of the transformer 6 since the capacitors 8 cut the DC components of the positive voltages at the output terminals 2 and 3.

Figure 22:
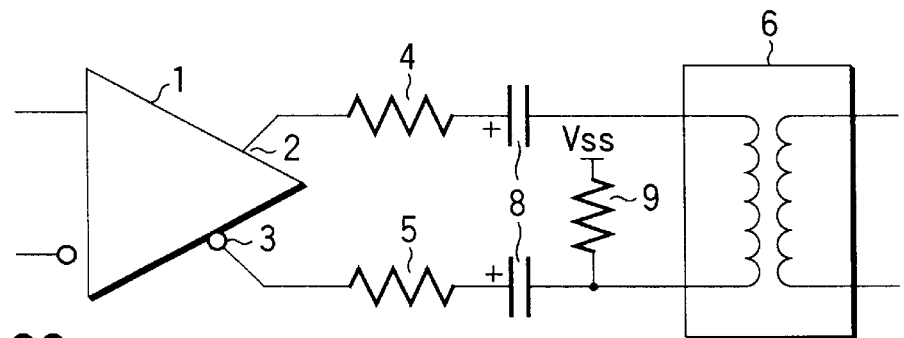
FIG. 22 is a circuit diagram showing a fourteenth example of the analog signal transmission circuit according to the embodiment of the present invention.

FIG. 22 shows the fourteenth example of the transmitter provided in the analog signal transmission circuit according to the embodiment of the present invention.

In the fourteenth example, the negative-side terminals of the capacitors 8 are connected through the transformer 6. One end of the resistor 9 is connected to a node at which the transformer 6 is connected to the negative-side terminal of one of the capacitors 8 which is connected to the output terminal 3, and the other end of the resistor 9 is connected to the negative power supply Vss. This example is also directed to the case where the DC voltages at the output terminals 2 and 3 are positive with respect to the potential of the power supply Vss. The potentials of the DC components at the negative sides of the capacitors 8 are held at the potential of the negative power supply Vss by the resistor 9. The capacitors 8 are forward-biased since the potentials at the output terminals 2 and 3 are positive.

Figure 23:
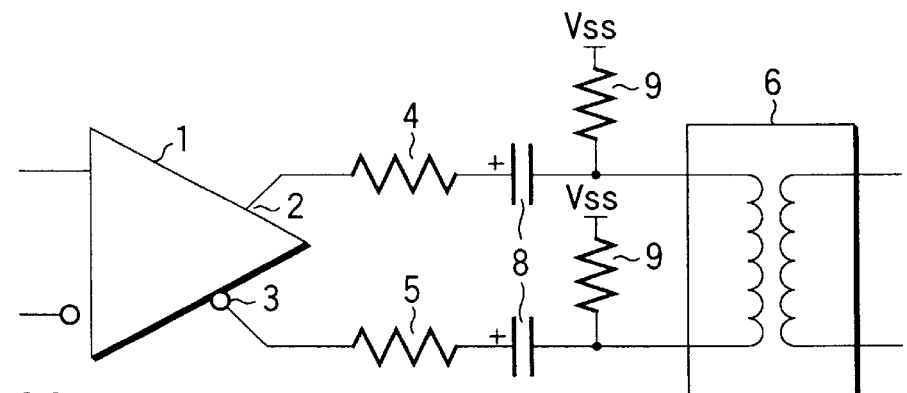
FIG. 23 is a circuit diagram showing a fifteenth example of the analog signal transmission circuit according to the embodiment of the present invention.

FIG. 23 shows the fifteenth example of the transmitter provided in the analog signal transmission circuit according to the embodiment of the present invention.

In the fifteenth example, the negative-side terminals of the two polar capacitors 8 are connected through the transformer 6. The ends of the resistors 9 are respectively connected to the negative-side terminals of the capacitors 8, and the other ends of the resistors 9 are connected to the negative power supplies Vss. This example is also directed to the case where the DC voltages at the output terminals 2 and 3 are positive with respect to the potential of the power supplies Vss. The number of resistors is larger than that of resistors provided in the transmitter shown in each of FIGS. 21 and 22, in order to more balance the AC component. When the ground potential varies, the varied potential is applied to the transformer 6 as a common mode noise, and a common mode component is eliminated by the transformer 6.

Figure 24:
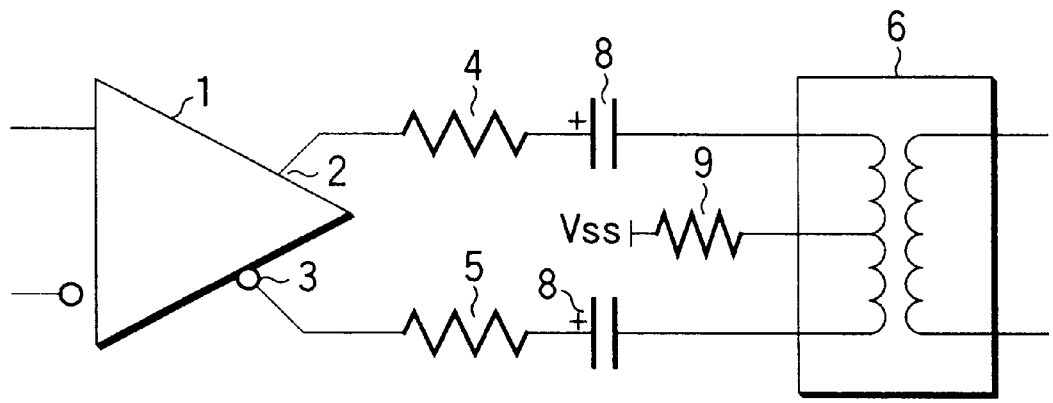
FIG. 24 is a circuit diagram showing a sixteenth example of the analog signal transmission circuit according to the embodiment of the present invention.

FIG. 24 shows the sixteenth example of the transmitter provided in the analog signal transmission circuit according to the embodiment of the present invention.

In the sixteenth example, the transformer 6 and the resistor 9 are connected between the negative-side terminals of the two polar capacitors 8. One end of the resistor 9 is connected to the tap of the transformer 6, and the other end of the resistor 9 is connected to the negative power supply Vss. This example is also directed to the case where the DC voltages at the output terminals 2 and 3 are positive with respect to the potential of the power supply Vss. The tap is located at a middle point of the windings, balancing the AC component as in the transmitter shown in FIG. 23. In the transmitter shown in FIG. 24, a common mode noise is applied to the transformer 6 through the resistor 9, and a common mode noise component is eliminated by the transformer 6. As a result, no noise is transmitted to the communication line.

Figure 25:
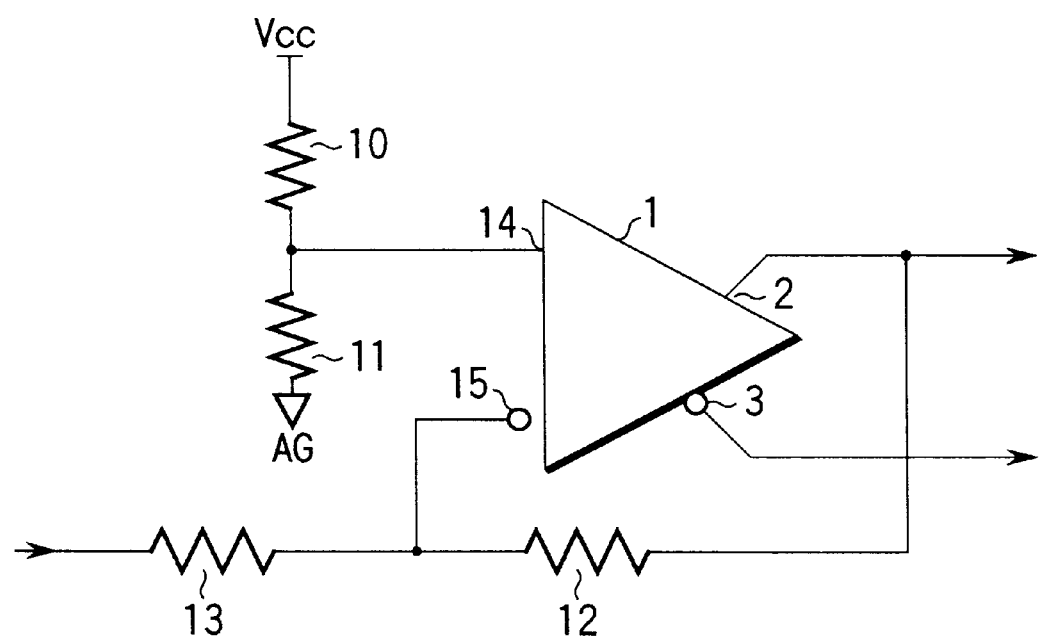
FIG. 25 is a circuit diagram showing the first example of an operating point-determining circuit of an amplifier provided in the analog signal transmission circuit according to the embodiment of the present invention.

FIG. 25 shows a circuit for applying a positive DC voltage to the output terminals 2 and 3 provided in each of the transmitters shown in FIGS. 8, 10 to 12 and 21 to 24. A voltage dividing circuit comprising resistors 10 and 11 generates an optional positive voltage by dividing the potential of the power supply Vcc and the ground potential. The positive voltage is applied to a positive input terminal 14 of the amplifier 1. Thereby, the operating point of the amplifier 1 is determined, and the output terminals 2 and 3 have the aforementioned positive voltages, and thus has DC operating point-potentials. A negative-feedback resistor 12 is connected to a negative input terminal 15 and the positive output terminal 2. An input resistor 13 is connected to the negative input terminal 15. The amplification degree of the amplifier 1 depends on the total values of the negative-feedback resistor 12 and the input resistor 13.

Figure 26:
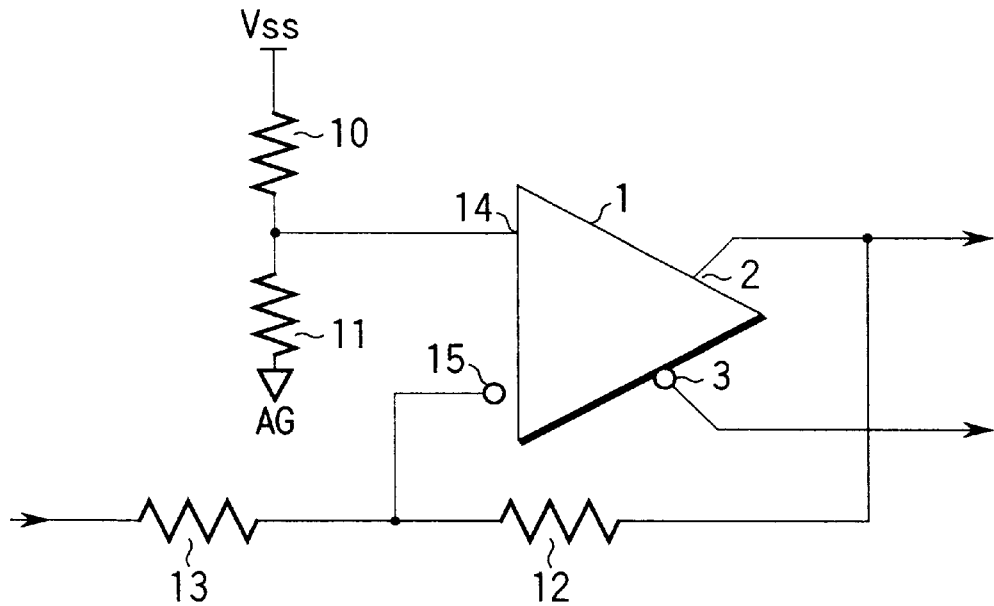
FIG. 26 is a circuit diagram showing the second example of the operating point-determining circuit of the amplifier provided in the analog signal transmission circuit according to the embodiment of the present invention.

FIG. 26 shows a circuit for applying a negative DC voltage to the output terminals 2 and 3 provided in each of the transmitters shown in each of FIGS. 8, 10–12, and 21–24. The voltage dividing circuit comprising the resistors 10 and 11 generates an optional negative voltage by dividing the potential of the negative power supply Vss and the potential of the ground terminal AG. The negative voltage is applied to the positive input terminal 14 of the amplifier 1. Thereby, the operating point of the amplifier 1 is determined, and the output terminals 2 and 3 have the above negative voltages, and thus have DC operating point-potentials. The negative-feedback resistor 12 is connected to the negative input terminal 15 and the positive output terminal 2. The input resistor 13 is connected to the negative input terminal 15. The amplification degree of the amplifier 1 depends on the total values of the negative-feedback resistor 12 and the input resistor 13.

Figure 27:
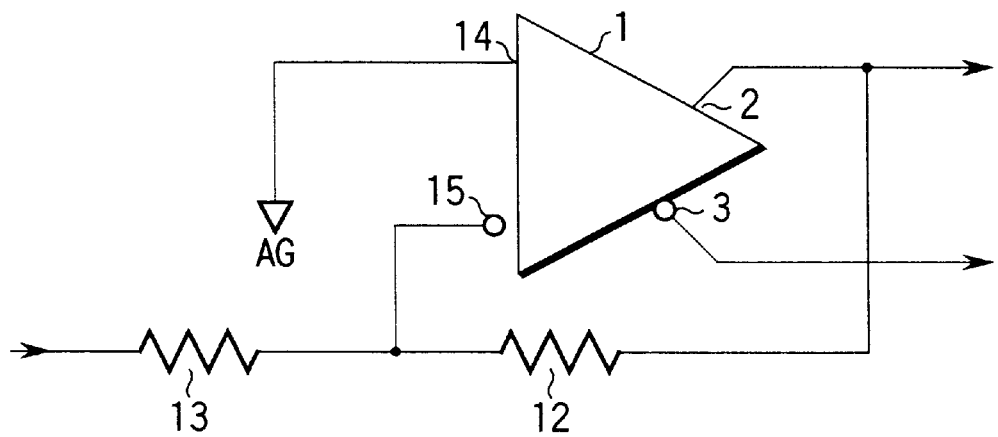
FIG. 27 is a circuit diagram showing the third example of the operating point-determining circuit of the analog signal transmission circuit according to the embodiment of the present invention.

FIG. 27 shows a circuit for applying the potential of the ground terminal AG to the output terminals 2 and 3. The circuit can be applied to the transmitter shown in each of FIGS. 17, and 21–24 as means for applying a bias. The positive input terminal 14 of the amplifier 1 is connected to the ground terminal AG. Thereby, the operating point of the amplifier 1 is determined, and each of the output terminals 2 and 3 has the ground potential, and thus has a DC operating point potential. The negative-feedback resistor 12 is connected to the negative input terminal 15 and the positive output terminal 2. The input resistor 13 is connected to the negative input terminal 15. The amplification degree of the amplifier 1 depends on the total value of the negative-feedback resistor 12 and the input resistor 13.

As mentioned above, in the embodiment of the present invention, a predetermined DC bias is applied to those terminals of the two polar capacitors 8 which have the same polarity. As a result, the potentials of the DC components at the terminals are fixed at the DC bias potential. Therefore, the relationship between the potential at one of the terminals and the DC offset potential of the output of the amplifier 1 is the same as that between the potential of the other and the DC offset potential of the output of the amplifier 1. A forward DC voltage can be applied to each of the capacitors 8. Therefore, the capacitors 8 can perform their inherent functions. Thus, the resultant circuit has a high performance.

The analog signal transmission circuit according to the embodiment of the present invention is utilized as a line interface circuit (hybrid circuit) of a modem. In a regular modem, the characteristic impedance of the line is 600 ohm. Therefore, in the embodiment of the present invention, the values of the resistors 4 and 5 are set such that the impedance of the modem including the transformer 6 is 600 ohm. The value of each of the resistors 4 and 5 is set to be 300 ohm if a transformer is used which has a sufficient inductance and windings having a turns ratio of 1 to 1. The optimal values of the resistors 4 and 5 are determined in accordance with the characteristics of the amplifier 1 and transformer 6.

A four-wire communication line used for the user, as well as a two-wire communication line for a specific use, may be used as the aforementioned communication line.

If the transmission line does not need to have a predetermined impedance, the resistors 4 and 5 may be omitted, and may be replaced with a jumper wire having 0 ohm. Furthermore, the present invention can also be applied to the transmission of an audio signal.

According to the above explanations, the resistor is used as the element for applying a DC bias. However, the inductance element may be used as the element for applying a DC bias, instead of the resistor.

The resistance value of the DC component of the inductance element is 0 ohm. However, the inductance element is featured in that the resistance value of the AC component is sufficient for a frequency of a signal used in the circuit.

The capacitors 8 may be located in any position on the path extending from the output terminal 2 to the output terminal 3, if they are connected in series such that the terminals having the same polarity are connected to each other. For example, in the analog signal transmission circuit shown in FIG. 8, even if the two polar capacitors 8 are connected in series such that the output resistor 4 is provided between them, the same advantage is obtained.

The resistor 9 may be located in any position of the path between the capacitors 8.

Furthermore, the number of capacitors 8 is not limited to two. It sometimes exceeds two in order that the capacitors 8 have a desired total capacitance. In this case, the capacitors 8 are connected either in series or in parallel.

The number of resistors 9 is not limited to one.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An analog signal transmission circuit comprising:
   a transformer;
   an amplifier for driving the transformer;
   first and second polar capacitors connected in series between the amplifier and the transformer such that those terminals of the first and second polar capacitors which have the same polarity are connected to each other; and
   an element, connected to the terminals of the first and second polar capacitors, for applying a DC bias in accordance with the polarity of the terminals of the first and second polar capacitors.

2. The circuit according to claim 1, wherein the element applies the DC bias to the first and second polar capacitors such that a forward DC voltage is applied to the first and second polar capacitors.

3. The circuit according to claim 1, wherein:
   the amplifier has differential output terminals respectively connected to ends of one of windings of the transformer;
   the first and second polar capacitors are connected in series on one of a path extending between said one of the windings and a positive one of the output terminals of the amplifier and a path extending between said one of the windings and a negative one of the output terminals of the amplifier, such that said terminals of the first and second polar capacitors which have the same polarity are connected to each other; and
   the element includes one of a resistor and an inductance element, one end of said one of the resistor and the inductance element being connected to a node at which the first and second polar capacitors are connected to each other, the other end of said one of the resistor and the inductance element being connected to a predetermined power supply terminal.

4. The circuit according to claim 3, wherein the first and second polar capacitors are connected in series such that negative-side terminals of the first and second polar capacitors are connected to each other, and said other end of said one of the resistor and the inductance element is connected to a ground potential supplying terminal.

5. The circuit according to claim 3, wherein the first and second polar capacitors are connected in series such that negative-side terminals of the first and second polar capacitors are connected to each other, and said other end of said one of the resistor and the inductance element is connected to a negative power supply terminal.

6. The circuit according to claim 3, wherein the first and second polar capacitors are connected in series such that positive-side terminals of the first and second polar capacitors are connected to each other, and said other end of said one of the resistor and the inductance element is connected to a ground potential supplying terminal.

7. The circuit according to claim 3, wherein the first and second polar capacitors are connected in series such that positive-side terminals of the first and second polar capacitors are connected to each other, and said other end of said one of the resistor and the inductance element is connected to a positive power supply terminal.

8. The circuit according to claim 1, wherein:
   the amplifier has differential output terminals respectively connected to ends of one of windings of the transformer;
   the first and second polar capacitors are connected in series through said one of the windings of the transformer such that said terminals of the first and second polar capacitors which have the same polarity are connected to each other; and the element includes one of a resistor and an inductance element, one end of said one of the resistor and the inductance element being connected to a node at which said one of the windings is connected to one of the first and second polar capacitors, the other end of said one of the resistor and the inductance element being connected to a predetermined power supply potential supplying terminal.

9. The circuit according to claim 8, wherein the first and second polar capacitors are connected in series through said one of the windings of the transformer such that negative-side terminals of the first and second polar capacitors are connected to each other, and said other end of said one of the resistor and the inductance element is connected to a ground potential supplying terminal.

10. The circuit according to claim 8, wherein the first and second polar capacitors are connected in series through said one of the windings of the transformer such that negative-side terminals of the first and second capacitors are connected to each other, and said other end of said one of the resistor and the inductance element is connected to a negative power supply terminal.

11. The circuit according to claim 8, wherein the first and second polar capacitors are connected in series through said one of the windings of the transformer such that positive-side terminals of the first and second capacitors are connected to each other, and said other end of said one of the resistor and the inductance element is connected to a ground potential supplying terminal.

12. The circuit according to claim 8, wherein the first and second polar capacitors are connected in series through said one of the windings of the transformer such that positive-side terminals of the first and second polar capacitors are connected to each other, and said other end of said one of the resistor and the inductance element is connected to a positive power supply terminal.

13. The circuit according to claim 1, wherein:
the amplifier has differential output terminals respectively connected to ends of said one of the windings of the transformer;
the first and second polar capacitors are connected in series through said one of the windings of the transformer such that said terminals of the first and second polar capacitors which have the same polarity are connected to each other; and
the element includes (i) one of a first resistor and a first inductance element, one end of said one of the first resistor and the inductance element being connected to a node at which said one of the windings is connected to the first polar capacitor, the other end of said one of the first resistor and the inductance element being connected to a predetermined power supply potential supplying terminal, and (ii) one of a second resistor and a second inductance element, one end of said one of the second resistor and the second inductance element being connected to a node at which said one of the windings is connected to the second polar capacitor, and the other end of said one of the resistor and the second inductance element being connected to the predetermined power supply potential supplying terminal.

14. The circuit according to claim 13, wherein the first and second polar capacitors are connected in series through said one of the windings of the transformer such that negative-side terminals of the first and second polar capacitors are connected to each other, and said other end of said one of the first resistor and the first inductance element and said other end of said one of the second resistor and the second inductance element are connected to a ground potential supplying terminal.

15. The circuit according to claim 13, wherein the first and second polar capacitors are connected in series through said one of the windings of the transformer such that negative-side terminals of the first and second polar capacitors are connected to each other, and said other end of said one of the first resistor and the first inductance element and said other end of said one of the second resistor and the second inductance element are connected to a negative power supply terminal.

16. The circuit according to claim 13, wherein the first and second polar capacitors are connected in series through said one of the windings of the transformer such that positive-side terminals of the first and second polar capacitors are connected to each other, and said other end of said one of the first resistor and the first inductance element and said other end of said one of the second resistor and the second inductance element are connected to a ground potential supplying terminal.

17. The circuit according to claim 13, wherein the first and second polar capacitors are connected in series through said one of the windings of the transformer such that positive-side terminals of the first and second polar capacitors are connected to each other, and said other end of said one of the first resistor and the first inductance element and said other end of said one of the second resistor and the second inductance element are connected to a positive power supply terminal.

18. The circuit according to claim 1, wherein:
the amplifier has differential output terminals respectively connected to ends of one of windings of the transformer;
the first and second polar capacitors are connected in series through said one of the windings of the transformer such that said terminals of the first and second polar capacitors which have the same polarity are connected to each other; and
the element includes one of a resistor and an inductance element, one end of said one of the resistor and the inductance element being connected to a middle tap of the transformer, the other end of said one of the resistor and the inductance element being connected to a predetermined power supply potential supplying terminal.

19. The circuit according to claim 18, wherein the first and second polar capacitors are connected in series such that negative-side terminals of the first and second polar capacitors are connected to each other, and said other end of said one of the resistor and the inductance element is connected to a ground potential supplying terminal.

20. The circuit according to claim 18, wherein the first and second polar capacitors are connected in series such that negative-side terminals of the first and second polar capacitors are connected to each other, and said other end of said one of the resistor and the inductance element is connected to a negative power supply terminal.

21. The circuit according to claim 18, wherein the first and second polar capacitors are connected in series such that positive-side terminals of the first and second polar capacitors are connected to each other, and said other end of said one of the resistor and the inductance element is connected to a ground potential supplying terminal.

22. The circuit according to claim 18, wherein the first and second polar capacitors are connected in series such that positive-side terminals of the first and second polar capacitors are connected to each other, and said other end of said one of the resistor and the inductance element is connected to a positive power supply terminal.

23. The circuit according to claim 4, wherein the amplifier comprises a differential amplifier having a positive input terminal, a positive output terminal, a negative input terminal, and a negative output terminal, and an operating point-determining circuit for dividing a positive power supply voltage and a ground potential, thereby generating an optional positive voltage, and applying the positive voltage to the positive input terminal of the differential amplifier, thereby making the positive and negative output terminals of the differential amplifier output positive DC voltages.

24. The circuit according to claim 9, wherein the amplifier comprises a differential amplifier having a positive input terminal, a positive output terminal, a negative input terminal, and a negative output terminal, and an operating point-determining circuit for dividing a positive power supply voltage and a ground potential, thereby generating an optional positive voltage, and applying the positive voltage to the positive input terminal of the differential amplifier, thereby making the positive and negative output terminals of the differential amplifier output positive DC voltages.

25. The circuit according to claim 14, wherein the amplifier comprises a differential amplifier having a positive input terminal, a positive output terminal, a negative input terminal, and a negative output terminal, and an operating point-determining circuit for dividing a positive power supply voltage and a ground potential, thereby generating an optional positive voltage, and applying the positive voltage to the positive input terminal of the differential amplifier, thereby making the positive and negative output terminals of the differential amplifier output positive DC voltages.

26. The circuit according to claim 19, wherein the amplifier comprises a differential amplifier having a positive input terminal, a positive output terminal, a negative input terminal, and a negative output terminal, and an operating point-determining circuit for dividing a positive power supply voltage and a ground potential, generating an optional positive voltage, and applying the positive voltage to the positive input terminal of the differential amplifier, thereby making the positive and negative output terminals of the differential amplifier output positive DC voltages.

27. The circuit according to claim 5, wherein the amplifier comprises a differential amplifier having a positive input terminal, a positive output terminal, a negative input terminal, and a negative output terminal, and an operating point-determining circuit for dividing a positive power supply voltage and a ground potential, generating an optional positive voltage, and applying the positive voltage to the positive input terminal of the differential amplifier, thereby making the positive and negative output terminals of the differential amplifier output positive DC voltages.

28. The circuit according to claim 10, wherein the amplifier comprises a differential amplifier having a positive input terminal, a positive output terminal, a negative input terminal, and a negative output terminal, and an operating point-determining circuit for dividing a positive power supply voltage and a ground potential, generating an optional positive voltage, and applying the positive voltage to the positive input terminal of the differential amplifier, thereby making the positive and negative output terminals of the differential amplifier output positive DC voltages.

29. The circuit according to claim 15, wherein the amplifier comprises a differential amplifier having a positive input terminal, a positive output terminal, a negative input terminal, and a negative output terminal, and an operating point-determining circuit for dividing a positive power supply voltage and a ground potential, generating an optional positive voltage, and applying the positive voltage to the positive input terminal of the differential amplifier, thereby making the positive and negative output terminals of the differential amplifier output positive DC voltages.

30. The circuit according to claim 20, wherein the amplifier comprises a differential amplifier having a positive input terminal, a positive output terminal, a negative input terminal, and a negative output terminal, and an operating point-determining circuit for dividing a positive power supply voltage and a ground potential, generating an optional positive voltage, and applying the positive voltage to the positive input terminal of the differential amplifier, thereby making the positive and negative output terminals of the differential amplifier output positive DC voltages.

31. The circuit according to claim 6, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

32. The circuit according to claim 11, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

33. The circuit according to claim 16, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

34. The circuit according to claim 21, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

35. The circuit according to claim 7, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

36. The circuit according to claim 12, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

37. The circuit according to claim 17, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

38. The circuit according to claim 22, wherein the amplifier comprises a differential amplifier having a positive input terminal, a positive output terminal, a negative input terminal, and a negative output terminal, and an operating point-determining circuit for dividing a negative power supply voltage and a ground potential, generating an optional negative voltage, and applying the negative voltage to the positive input terminal of the differential amplifier, thereby making the positive and negative output terminals of the differential amplifier output negative DC voltages.

39. The circuit according to claim 7, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

40. The circuit according to claim 12, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

41. The circuit according to claim 17, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

42. The circuit according to claim 22, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

43. The circuit according to claim 5, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

44. The circuit according to claim 10, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

45. The circuit according to claim 15, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

46. The circuit according to claim 20, wherein the amplifier comprises a differential amplifier having a positive input terminal, a positive output terminal, a negative input terminal and a negative output terminal, and an operating point-determining circuit for applying a ground potential to the positive input terminal of the differential amplifier, thereby making each of the positive and negative output terminals of the differential amplifier output the ground potential.

47. A data processing apparatus comprising:
a memory circuit for storing data;
a CPU for controlling a reading operation in which data is read out from the memory circuit and a writing operation in which data is written in the memory circuit;
a modulator for modulating the data read out by the CPU from the memory circuit, and demodulating a signal externally transmitted through a communication line; and
an analog signal transmission circuit comprising (i) a transformer, (ii) an amplifier for driving the transformer, (iii) first and second polar capacitors connected in series between the amplifier and the transformer such that those terminals of the first and second polar capacitors which have the same polarity are connected to each other; and (iv) an element, connected to one of said terminals of the first and second polar capacitors which have the same polarity, for applying a DC bias to said one of said terminals of the first and second capacitors in accordance with the polarity of said terminals of the first and second polar capacitors.

* * * * *